United States Patent [19]
Patterson et al.

[11] Patent Number: 5,662,000
[45] Date of Patent: Sep. 2, 1997

[54] DETENT SPRING FOR ROTATABLE GRIP ACTUATING SYSTEM

[75] Inventors: Sam Patterson, Solana Beach, Calif.; John David Cheever, Chicago, Ill.; Michael W. Larson, Chicago, Ill.; Tymme A. Laun, Chicago, Ill.; William M. Yaney, Sun City, Calif.

[73] Assignee: SRAM Corporation, Chicago, Ill.

[21] Appl. No.: 609,676

[22] Filed: Mar. 1, 1996

Related U.S. Application Data

[63] Continuation of Ser. No. 295,370, Aug. 24, 1994, Pat. No. 5,524,501, which is a continuation-in-part of Ser. No. 207,249, Mar. 7, 1994, Pat. No. 5,476,019.

[51] Int. Cl.⁶ .............................. G05G 5/06; B62K 23/04
[52] U.S. Cl. ..................... 74/475; 74/489; 74/506; 74/527
[58] Field of Search ........................ 74/475, 489, 506, 74/527

[56] References Cited

U.S. PATENT DOCUMENTS

| | | | |
|---|---|---|---|
| 1,231,055 | 6/1917 | Packard . | |
| 2,153,430 | 4/1939 | Newman | 74/527 |
| 2,626,335 | 1/1953 | Landin | 74/527 |
| 3,020,778 | 2/1962 | Davidson | 74/489 |
| 3,218,879 | 11/1965 | Reed | 74/489 |
| 3,489,029 | 1/1970 | Cappelle et al. | 74/527 |
| 3,522,745 | 8/1970 | Milosevic | 74/489 |
| 4,055,093 | 10/1977 | Ross | 74/501 |
| 4,191,065 | 3/1980 | Golobay et al. | 74/489 |
| 4,201,095 | 5/1980 | Cirami | 74/217 |
| 4,267,744 | 5/1981 | Yamasaki | 74/475 |
| 4,384,864 | 5/1983 | Bonnard | 474/82 |
| 4,526,056 | 7/1985 | Yamanaka | 74/489 |
| 4,548,092 | 10/1985 | Strong | 74/475 |
| 4,619,154 | 10/1986 | Yamanaka | 74/489 |
| 4,900,291 | 2/1990 | Patterson | 474/80 |
| 4,938,733 | 7/1990 | Patterson | 474/80 |
| 5,102,372 | 4/1992 | Patterson | 474/80 |
| 5,134,897 | 8/1992 | Romano | 74/489 |
| 5,186,071 | 2/1993 | Iwasaki | 474/80 |
| 5,197,927 | 3/1993 | Patterson | 474/80 |
| 5,241,877 | 9/1993 | Chen | 74/489 |
| 5,261,858 | 11/1993 | Browning | 474/69 |

FOREIGN PATENT DOCUMENTS

| | | |
|---|---|---|
| 0294720 | 6/1988 | European Pat. Off. . |
| 0523257 | 2/1992 | European Pat. Off. . |
| 0529664 | 8/1992 | European Pat. Off. . |
| 0566024 | 4/1993 | European Pat. Off. . |
| 0566025 | 4/1993 | European Pat. Off. . |
| 0585473 | 9/1993 | European Pat. Off. . |
| 7210452 | 3/1973 | France . |
| 7246272 | 7/1974 | France . |
| 3317382 | 11/1984 | Germany . |
| 3938454 | 5/1991 | Germany . |
| 9219488 | 11/1992 | Japan . |
| 5-32191 | 8/1993 | Japan . |
| 9402348 | 2/1994 | Japan . |
| 667244 | 8/1985 | Switzerland . |
| 2024381 | 1/1980 | United Kingdom . |
| 2187050 | 8/1987 | United Kingdom . |

*Primary Examiner*—Allan D. Herrmann
*Attorney, Agent, or Firm*—Jefferson Perkins

[57] ABSTRACT

A detent spring for use in a rotatable grip actuating system for a Bowden tube motion translation system used to actuate a derailleur gear shifting system on a bicycle. The detent spring, which is formed of spring type metal has a U-shape, with one leg positioned in an elongated arcuate slot in a first member which rotates within a second member having notches on an inner surface which are engaged by a detent formed on the second leg of the spring.

19 Claims, 5 Drawing Sheets

DETENT SPRING FOR ROTATABLE GRIP ACTUATING SYSTEM

This application is a continuation of application Ser. No. 08/295,370, filed Aug. 24, 1994, now U.S. Pat. No. 5,524, 501, which in turn is a continuation-in-part of application Ser. No. 08/207,249, filed Mar. 7,1994 now U.S. Pat. No. 5,476,019 issued Dec. 19, 1995.

BACKGROUND OF THE INVENTION

I. Field of the Invention

This invention relates to a rotatable grip actuating system for use with a Bowden tube (cable within a tube) type motion translation system. More particularly, it relates to a detent spring for use in a rotatable grip actuating system designed for operating a derailleur gear shifting system on a bicycle.

II. Description of Related Art Including Information Disclosed Under 37 CFR §§ 1.97 & 1.98

One type of shift actuator that is conveniently rotatably mounted on a handlebar and positioned so as not the require the rider to remove a hand from the customary handlebar grip to operate the actuator is disclosed in U. S. Pat. No. 5,102,372 issued Apr. 7, 1992 to three of the co-inventors of this application and assigned to the assignee of this application. Related application Ser. No. 08/207,249, filed Mar. 7, 1994, now U.S. Pat. No. 5,476,019 issued Dec. 19, 1995, sets forth an improvement in the actuating system set forth in U.S. Pat. No. 5,102,372. The improvement set forth in this last patent is in part directed to maximizing the mechanical advantage of a rotatable grip actuating system by minimizing the radius at which the cable is pulled. For the purpose of providing a full teaching of the construction and operating requirements of bicycle derailleur-type shifting systems, and particularly ones operated by a rotatable grip actuating system, the above-mentioned patents are incorporated herein by reference.

The rotatable grip actuating systems set forth in the above-cited patents, each have two principal components, one of which is rotatable with respect to the other. Notches are provided in facing circumferential surfaces of the two principal components. These notches cooperate with a spring to establish predetermined positions of the two principal components with respect to each other. The predetermined positions correspond to predetermined shifted positions of the derailleur chain.

As shown in the patents and FIGS. 1 and 2 of this application, the spring has in the past been formed as a plastic member. Referring to FIG. 1, the prior art plastic spring 200 has feet 202 and 204 located in a spring cavity 206, and an indexing projection 208 engaged in a detent notch 210 in a detent notch circle 212. The detent notches 210 have a difference between the angle on the cable release side of the detent notch and on the cable pull side. This difference in angles was provided to substantially balance out the torque required to rotate the grip out of a detent notch, since the cable tension provided by the derailleur mechanism naturally pulls the rotational grip in the direction of cable release.

As can be seen in FIG. 1, there are space limitations for accomplishing the detent action. The curvature of the handlebar and the curvature of the detent notch circle leaves a predetermined narrow arcuate space. Thus, it was found necessary to use a leaf spring in that space to provide the detent action, and a plastic leaf spring was first chosen. It has been found that the plastic spring 200, when left with the indexing projection or detent 208 between the notches, tends to deform plastically because of cold flow of the plastic caused by the continuous stress. That is, when the detent 208 is positioned between notches, it is pushed toward the center of the grip, with the leaf portions 214 being flattened. This deformation can result in the loss of the preload contact force between the detents 208 and the notches 210. The torque required to release a detent 208 is a function of the spring preload, contact angles and the stiffness of the leaf portions 214 of the plastic spring. If the preload force of the spring is significantly reduced, the release torque is also significantly reduced.

In another embodiment of the prior art as shown in FIG. 2, the leaf portions 214 of the plastic spring 200 are supported, when the detent 208 is in a notch 210, by a pair of feet 216 which engage a correspondingly located pair of projections 218 in the cavity 206. This embodiment was intended to maintain the preload force on the spring when the detent 208 was in a notch 210.

SUMMARY OF THE INVENTION

It is an object of this invention to provide a rotatable grip type actuating system with an improved detent spring which overcomes shortcomings of previously used plastic leaf springs. It is a further object of this invention, in a preferred embodiment thereof, to provide a detent spring made of a spring type metal, which is formed such that the indexing projection or detent on the spring is not a location of maximum stress in the spring. It is a further object of this invention to form a detent spring made of a spring type metal such that the action of the detent with respect to the foot of the spring is asymmetrical, thus providing differing actuating torques for opposite directions of rotation when interacting with a detent notch circle provided with symmetrical notches. It is a still further object of this invention to provide a detent spring which is readily made of a spring type metal and assembled in a rotatable grip actuating mechanism for a bicycle derailleur-type shifting system.

In accordance with a first embodiment of this invention, a detent spring assembly of a rotatable grip actuating system includes a detent spring which is formed with an elongated base having first and second ends, and with an arm which extends from the first end, over the elongated base. The free end of the arm has a notch engaging portion or detent having an apex which extends in a direction away from the base. A first member has an elongated notch for retaining the base of a detent spring. A second member rotatable with respect to the first member is has a second generally cylindrical surface located radially outward from the first surface. A series of spaced notches are formed in the second surface which may be engaged by the detent or notch engaging portion of the spring as the second member is rotated with respect to the first member. By choosing the material and cross-sectional thickness of the spring metal of which the spring is formed, and by choosing the geometry of the spring and that of the notches, the force required to rotate the second member with respect to the first may be determined. Further, due to the geometry of the spring, the forces required to rotate in opposite directions may be made different so as to compensate for the return spring force on the derailleur operating cable, thus equalizing the torque which must be applied to rotate the second member in either direction. In another embodiment of this invention, the spring, while of the same general shape as the spring of the first embodiment, is formed instead of an elongated length of cylindrical spring wire.

DETAILED DESCRIPTION OF THE PREFERRED EMBODIMENTS

Figure 3:
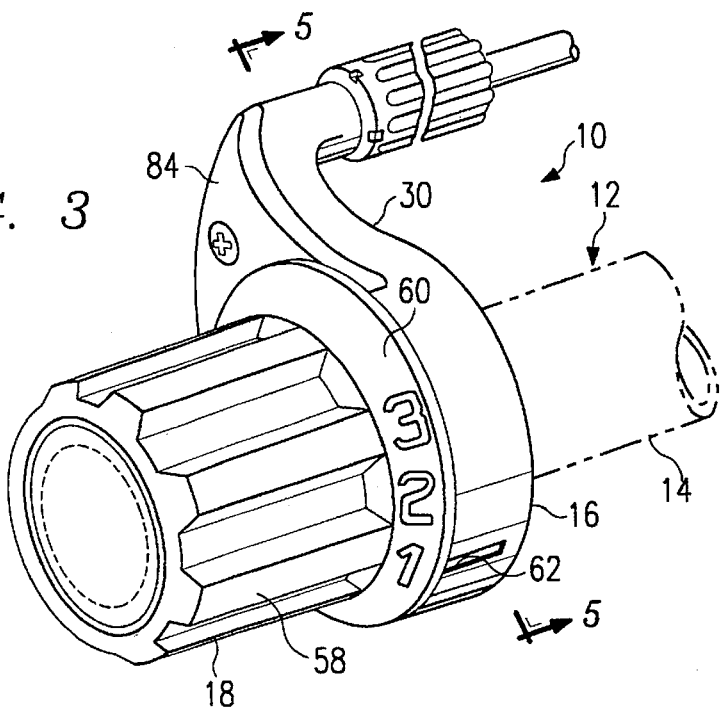
FIG. 3 is an isometric view of a first embodiment of a rotatable grip actuating system for a derailleur gear shifting system on a bicycle, in which a metal detent spring in accordance with this invention is employed.
Figure 4:
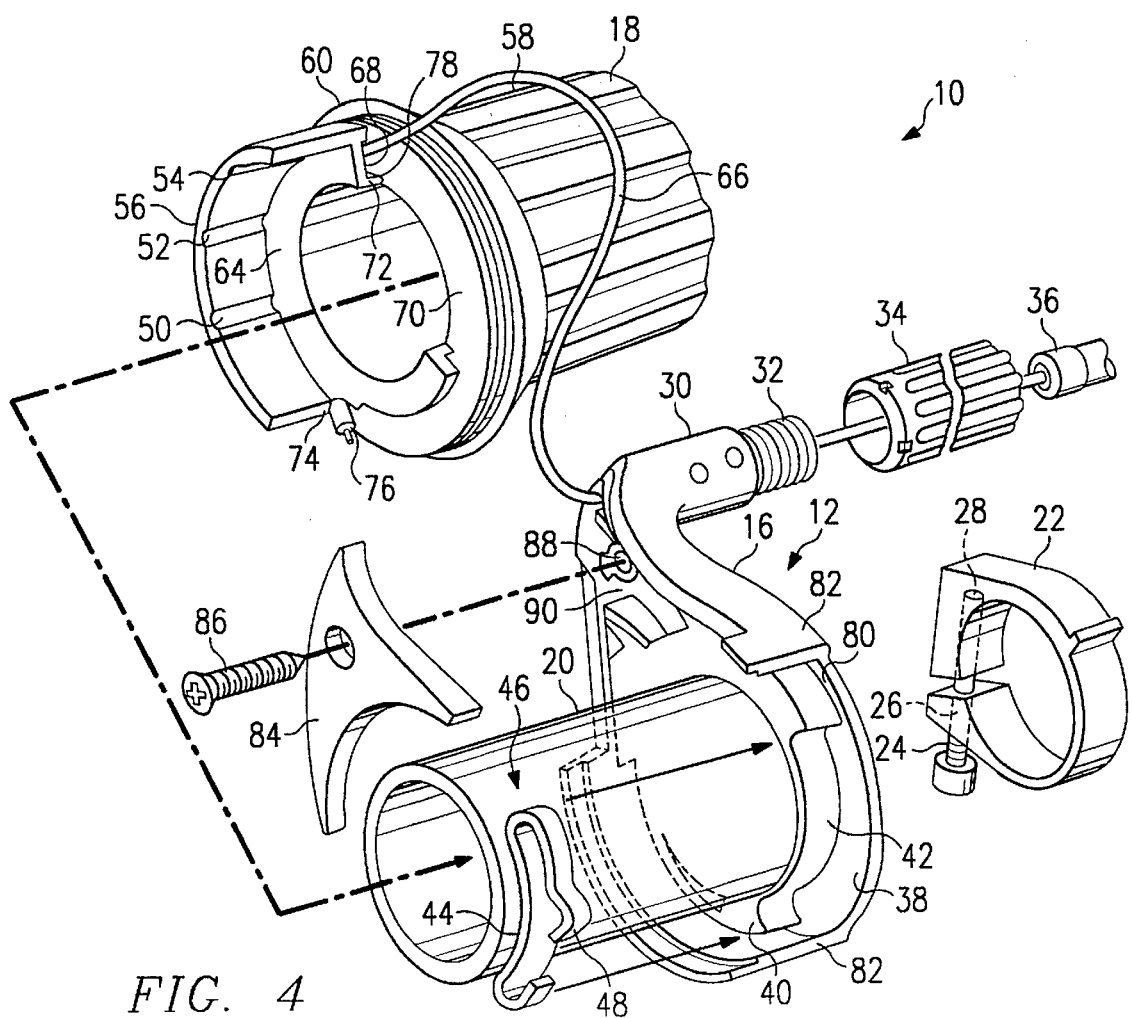
FIG. 4 is an exploded isometric view of the rotatable. grip actuating system shown in FIG. 3, incorporating a metal detent spring in accordance with a first embodiment of this invention.

Referring to FIGS. 3 and 4, the components of a rotatable grip actuating system and their assembly, including a detent spring 46 in accordance with a first embodiment of this invention will be described. A rotatable grip actuating system, indicated generally at 10 is placed over a handlebar 12. A portion 14 of the handlebar 12 shown projecting to the right in FIG. 3, is connected to the bicycle handlebar stem (not shown). Although not shown in FIG. 3, the handlebar 12 also projects to the left of the system 10 to support a customary stationary handgrip normally placed at the end of the handlebar.

The system 10 has two principal components: a housing 16 secured to the handlebar 12, and a rotatable grip 18. The housing 16 includes an elongated tube or mandrel 20 which is received in a snug fit over the handlebar 12. The housing 16 is formed with a pocket (not shown) on the right side as viewed in FIG. 3 for receiving a U-shaped clamp 22 which secures the housing 16 to the handlebar 12. The clamp 22 is secured to the handlebar by a bolt 24 which loosely passes through a hole 26 in one leg of the clamp and engages threads in a hole 28 provided in the other leg of the clamp.

Formed as a portion of the housing 16 is a cable guide tube 30. The guide tube 30 is provided at its distal end with external threads 32 for mating with internal threads provided on a coupler 34. The coupler 34 secures a cable tube 36 to the cable guide tube 30. Surrounding the mandrel 20 and disposed next to a radially extending wall 38 of the housing 16 is a spring retaining portion 40.

Formed in a generally cylindrical surface of the spring retaining portion 40 is an elongated notch 42 which captures a first portion 44 of a spring indicated generally at 46, a second portion or base of which spring cooperates with the rotatable grip 18 to define selected positions of the rotatable grip 18. First portion 44 of spring 46 rests in the notch 42, while a convex bend or detent 48 in the second portion of the spring is engageable in notches 50, 52 and 54 formed on the inner generally cylindrical or circumferential surface of wall 56 of the rotatable grip 18. As will be further described with respect to FIGS. 5 and 6, the interaction of the detent 48 of spring 46 with the notches 50, 52 and 54 defines position of the rotatable grip 18 with respect to the housing 16; these positions correspond to desired engagement positions of the derailleur shifting mechanism.

Figure 1:
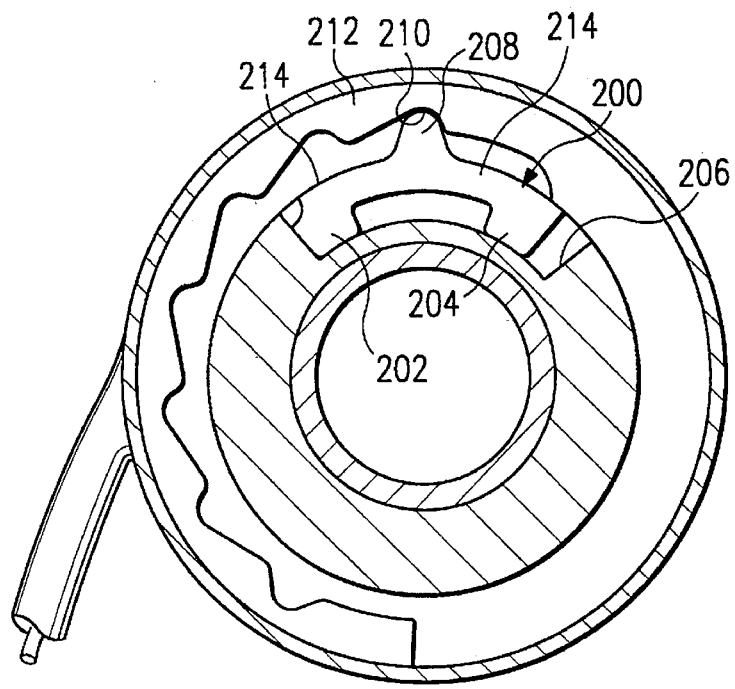
FIG. 1 is an axial cross-sectional view of a rotatable grip actuating system for a derailleur gear shifting system on a bicycle showing a plastic detent spring in accordance with the prior art.
Figure 2:
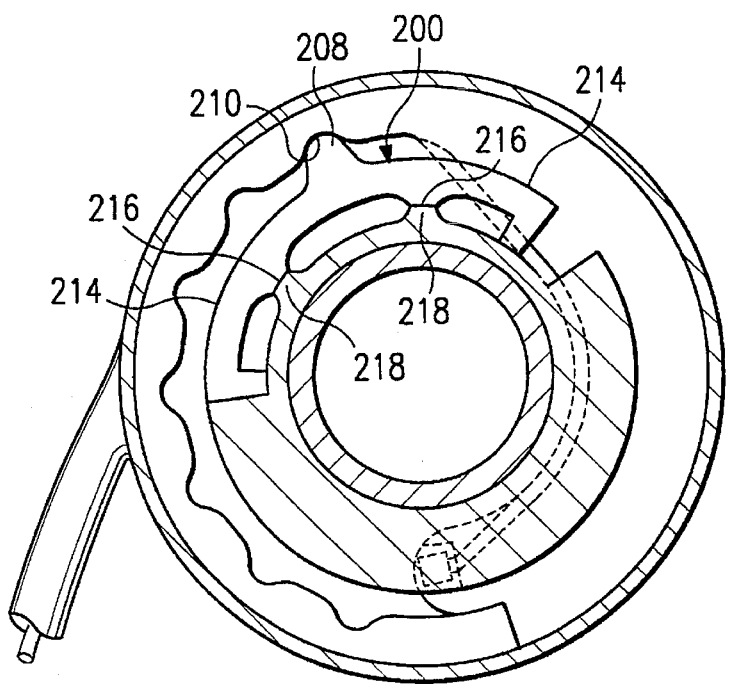
FIG. 2 is an axial cross-sectional view of a rotatable grip actuating system for a derailleur gear shifting system on a bicycle showing another embodiment of a plastic detent spring in accordance with the prior art.

The rotatable grip 18 is formed with an external grip portion 58 and an adjoining enlarged portion 60 on which may be printed numerals, shown as 1, 2 and 3 in FIG. 1, which when located with respect to an index mark 62 on the housing 16 define three operating positions of the handgrip assembly. Extending to the left of the grip portion 58, as viewed in FIG. 4, is not only the wall 56, but also a cable retaining and engaging portion 64 of rotatable grip 18. An operating cable 66 is retained behind a radially extending wall portion 68 of portion 64 and a radial extending face 70 of the enlarged portion 60. The operating cable rests upon a spool 72 of variable radius formed between the wall portion 68 and the radially extending face 70. The radius at which rotation of the rotatable grip 18 acts on the operating cable 66 is referred to as the spooling radius. Thus, a slot having a variable radial height is formed between the wall portion 68 and radially extending face 70 to form the spool 72. The radial height of the slot at end 74 of the slot is Just slightly larger than the diameter of the cable 66.

Figure 5:
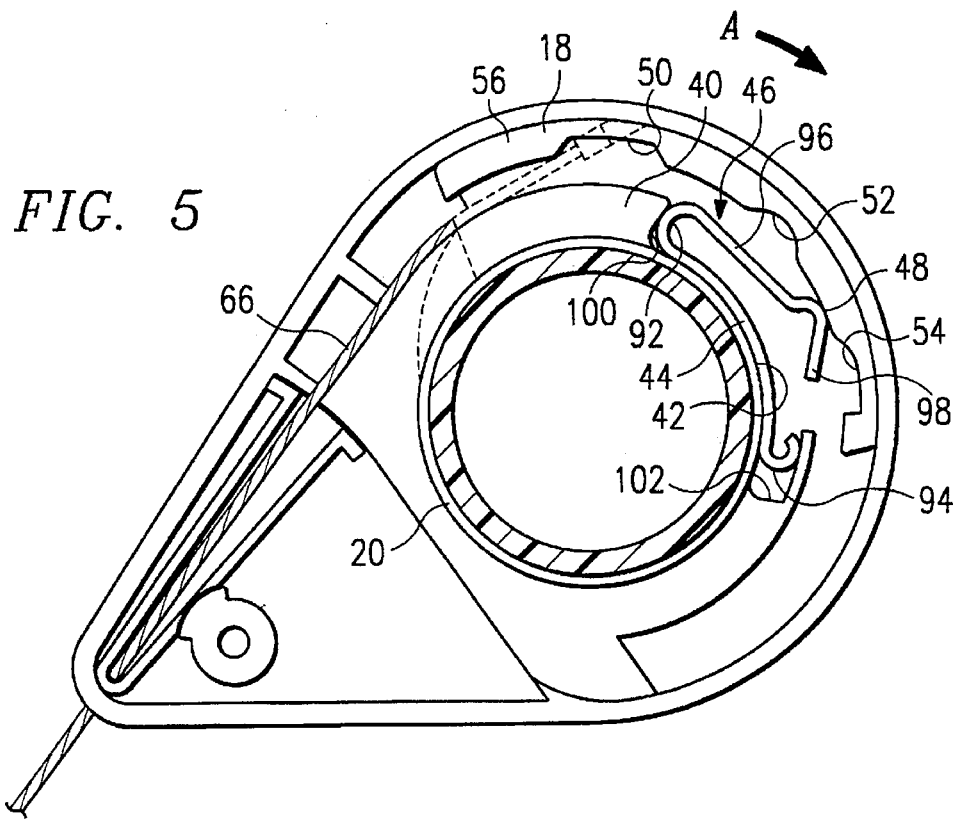
FIG. 5 is a partial cross-sectional view of a second embodiment of a rotatable grip actuating system according to the invention, the view corresponding to a section taken substantially along line 5—5 of FIG. 3, showing the rotatable grip actuating system in accordance with the second embodiment of this invention in a first operative position.
Figure 6:
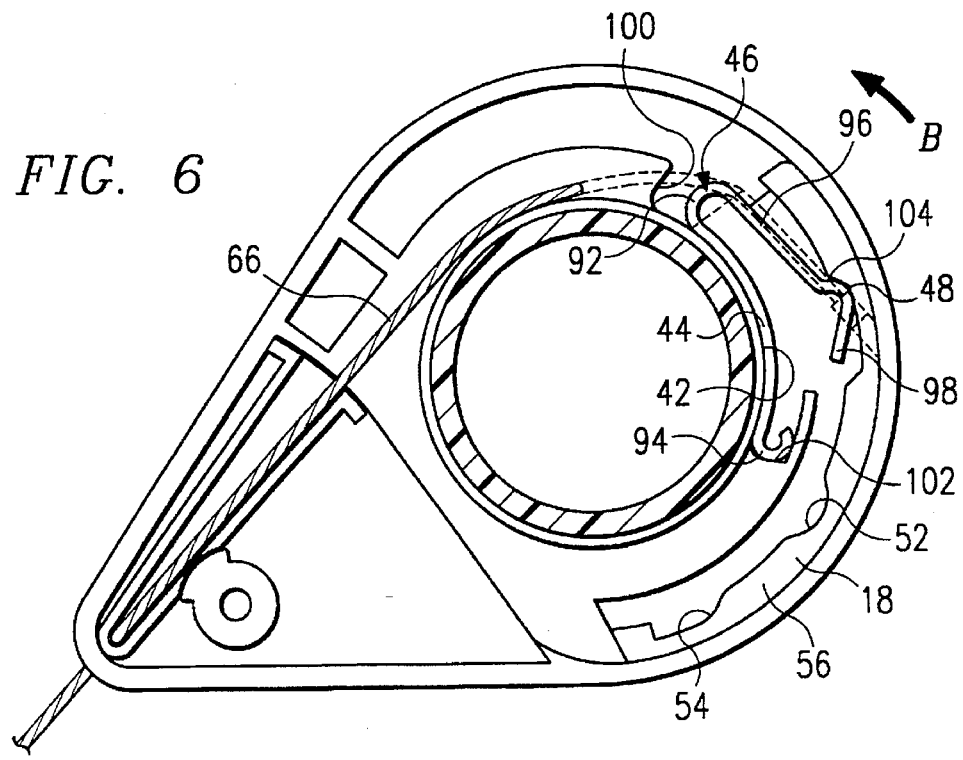
FIG. 6 is a partial cross-sectional view of the second embodiment as shown in FIG. 5, corresponding to a sectional view taken along the line 6—6 in FIG. 3, showing the rotatable grip actuating system in accordance with the second embodiment of this invention in a second operative position.

A retainer 76 is secured to the end of the cable to prevent it from being pulled through the slot. Since the spool 72 drops away at point 78 where the cable 66 exits from the slot, the radial height of the slot at point 78 is considerably higher than the diameter of the cable. While the cable is shown engaging the radially outward surface of the slot in FIG. 4, when the system is assembled and tension applied to the cable, it rests on the radially inward surface or spool 72 as shown in FIGS. 5 and 6. The embodiment of the invention shown in FIGS. 5 and 6 differs from the embodiment shown in FIGS. 3 and 4 only in the shape of detents 50 and 54.

With the cable 66 secured in the slot formed in the grip portion 18, and with first portion 44 of spring 46 placed in the elongated notch 42, the grip is assembled to the housing 16 in the direction of the arrow FIG. 4 such that the wall 56 is received in a space 80 between an outer wall 82 of the housing 16 and the spring retaining portion 40. To complete the assembly, a cover 84 is placed over the open portion of the cable guide tube 30 and secured in place by a screw 86 which is threadedly engaged in a hole 88 formed in a projection 90 extending from the housing 16.

Referring now to FIGS. 5 and 6, the role played by the spring 46 of this invention in the torque required for rotation of, and in defining selected positions of, rotatable grip 18 will be further described. The detent spring assembly portion of the rotatable grip actuating system includes an inward-facing generally cylindrical wall 56 in which are formed notches 50, 52 and 54. The number of notches corresponds to the number of positions required for actuation of the derailleur shifting system.

The stationary portion of the rotatable grip actuating system includes the mandrel 20 (FIG. 4) and a spring retaining or support member 40 having an outwardly facing generally cylindrical surface in which is formed a spring retaining elongated notch 42. As shown in cross-section in FIGS. 5 and 6 and in an isometric in FIG. 7, spring 46 is formed with a first portion in the form of an elongated base member 44, the first and second ends 92 and 94 respectively of which are formed in a generally semicircular shape. First end or curve 92 is curved at a radius $r_2$ around a center 93; second end or curve 94 is curved in a radius $r_{2'}$ around a center 95. A cantilever arm of linear extension 96 extends from the first end 92 of the spring 46 over the elongated base 44 to give the spring an overall narrow U-shape. Provided at the free end 98 of the arm 96 is a notch-engaging outwardly convex, (with respect to the base portion 44 bent portion or detent, that is curved at a radius $r_3$ around a center 97, with radius $r_3$ being smaller that radii $r_2$ and $r_{2'}$. The free end or straight extension 98 of the arm 96 is bent by this third sharp bend 98 inwardly toward the first or base member 44.

Figure 7:
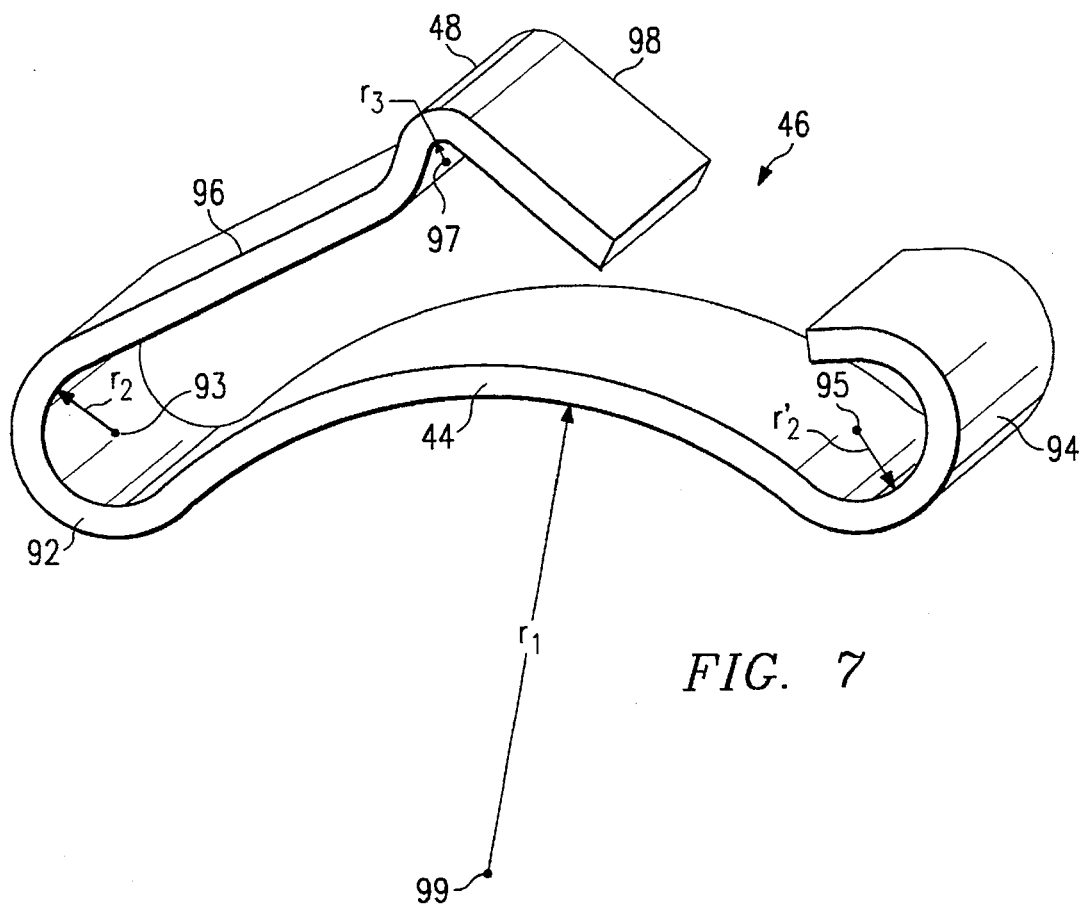
FIG. 7 is an isometric view of a detent spring in accordance with the first and second embodiments of this invention.

The base member 44 of the spring 46 is curved at a radius $r_1$ from a center 99, which is located on the opposite side of base member 44 from centers 93 and 95. Secondary radii $r_2$ and $r_{2'}$ are substantially smaller than first radius $r_1$. In FIG. 7, radius $r_1$ corresponds to the curvature of the base of the elongated notch 42. As best seen in FIG. 6, the ends or side walls 100 and 102 of elongated notch 42 are spaced apart at a greater distance than the distance between the extremities of the curved portions 92 and 94 of the spring. Upon rotation of the rotatable grip 18 and wall 56 with respect to the spring retaining portion 40,initially the spring 46 will be carried along by a detent in the wall 56 and will thus be shifted in the elongated notch 42 in the direction of rotation of the rotatable grip 18, unless a respective end 100 and 102, which is urged toward a corresponding end 92 or 94 respectively of the spring, is already in engagement therewith. The end 102 will come into engagement with the second end 94 of the spring when the rotatable grip 18 is rotated in the direction indicated by the arrow A. Conversely, when the rotatable grip 18 is rotated in the direction of the arrow B shown in FIG. 6, end 100 of the elongated notch 42 will come into engagement with the second end 92 of the spring 46.

Figure 8:
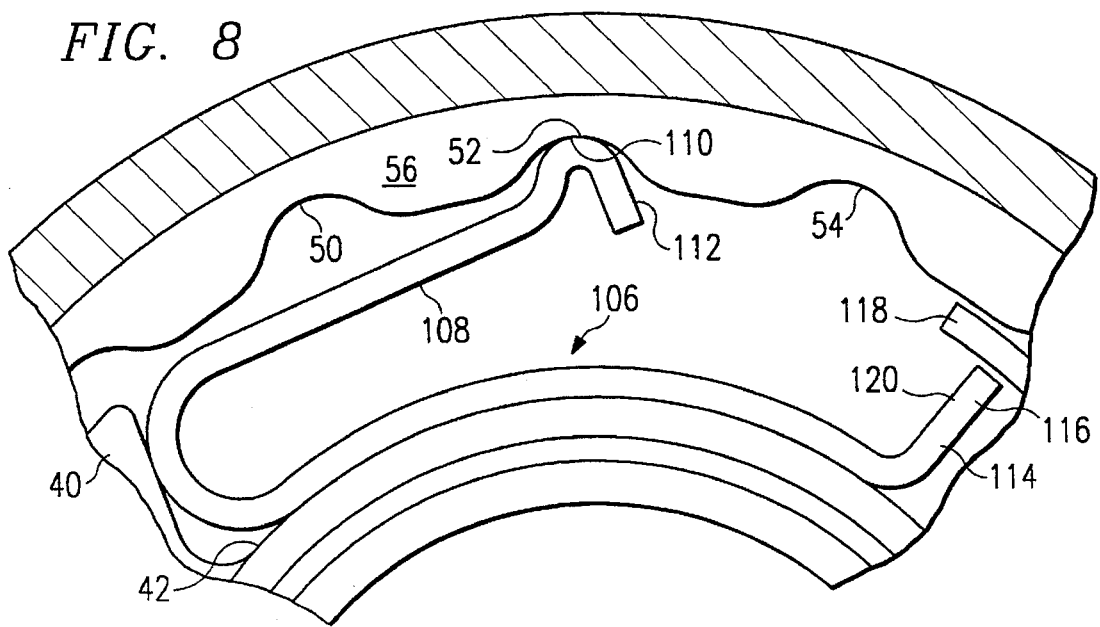
FIG. 8 is an enlarged fragmentary axial cross-sectional view showing a third embodiment of the detent spring of this invention in a position similar to that shown in FIG. 5.

Due to the notch engaging portion 48 being formed adjacent the free end of the elongated arm 96, the force required to move it in and out of one of the notches or detents 50, 52 or 54, which in the embodiment of FIGS. 3, 4 and 8 are symmetrical about their apices, depends on the direction of rotation. Because arm 96 is cantilever-loaded by the inner surface of wall 56 when rotatable grip 18 is being rotated in direction A, less force is required to rotate rotatable grip 18. That is, less force is required to depress the out of the engaged one of notches 50, 52 or 54, and therefore the arm 96, as the detent 48 moves out of the engaged notch. Because arm 96 is column-loaded by the inner surface of wall 56 as handgrip 18 is rotated in direction B (FIG. 6), the spring 46 offers greater resistance. The side of the detent 48, which continues as straight extension 98, abuts a sloping edge of a notch 50, 52 or 54 to first apply a force in a column direction down the arm 96 and the bend 92 to the end sidewall 100 of the notch. While the detent 48 will eventually be depressed as it moves out of the notch or detent due to continued rotation of the handgrip 18 of column loading, a greater force is required to do so than for rotation in the direction of arrow A, during which arm 96 is loaded in a cantilever direction with the spring 46 so formed, the notches 50, 52 and 54 can be made symmetrical (see the embodiment in FIGS. 4 and 8) while at the same time providing different degrees of resistance for rotation in opposite directions, thereby equalizing the force of the return spring in the derailleur shifting mechanism.

Because the metal of which the spring 46 is formed has a precisely defined yield point separating elastic and plastic deformation, the spring can be readily designed to operate within its elastic range at all times. Thus, the problem of spring fade experienced with a plastic spring can be eliminated. Further, because the stiffness of the spring can be determined, for instance, by varying the thickness of the spring leaf, a spring can be designed which will have a high contact force with the surface between notches when compressed, but a relatively low preload when residing in the notches 50, 52 and 54. To be able to design the spring in this manner is quite beneficial. For instance, the spring may be designed such that the rotatable grip 18 rotates freely in the cable release direction until the detent 48 of the spring meets the front wall of notches 50, 52 or 54, which is the desired cable position for a particular sprocket position.

Insofar as the shape of the base of the notches conforms to the shape of the apex of the detent 48 on spring 46, so as to precisely define a centered position, the curvature of the notch as it merges into the circumferential surface between the notches may have a larger radius, so as to cause less wear on both the detent 48 and the notches and the surfaces of the wall 56 engaged thereby. The torque required for rotating from one predetermined position to another can in part be defined by the angle which the sides of the notches 50, 52 and 54 make with the radius of the wall 56 extending between the notches.

Figure 9:
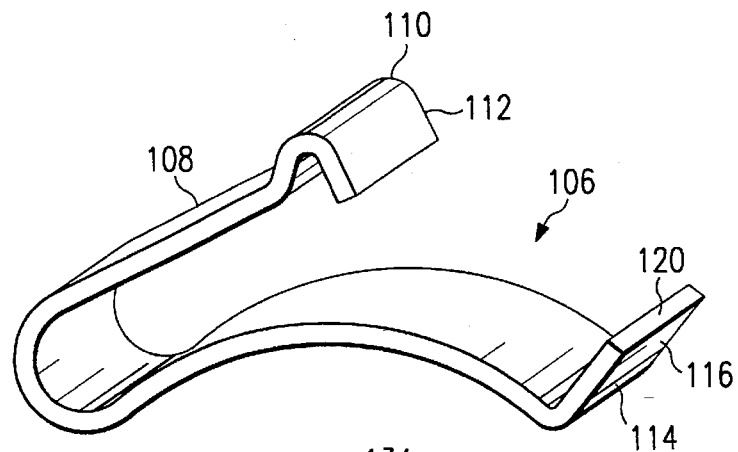
FIG. 9 is an isometric view of the third embodiment of the detent spring of this invention as shown in FIG. 8.

Referring now to FIGS. 8 and 9, a third embodiment of the spring of this invention will be described. The spring 106 is similar to the spring 46 shown in FIGS. 4–7, in that the first end of the spring 106 is curved and is provided with an arm 108. Further, a convex bend or detent 110 and extension 112 are formed at the free end of arm 108. The second end 114 of the spring 106 is formed with a radially extending portion 116. The spring retaining member 40 is provided with a circumferentially extending portion or barrier 118 located radially outward and extending over the elongated notch 42 and the free end 120 of the radially extending portion 116 of the spring. In this embodiment, the second end of the spring 114 is prevented from lifting by the engagement of free end 120 with the barrier 118. By thus preventing the lifting of the second end 114 of the spring when the spring retaining member 40 is rotated in either direction with respect to the wall 56, a force applied by the detent 110 as it moves in and out of the notches 50, 52 and 54 may be more precisely controlled.

Figure 10:
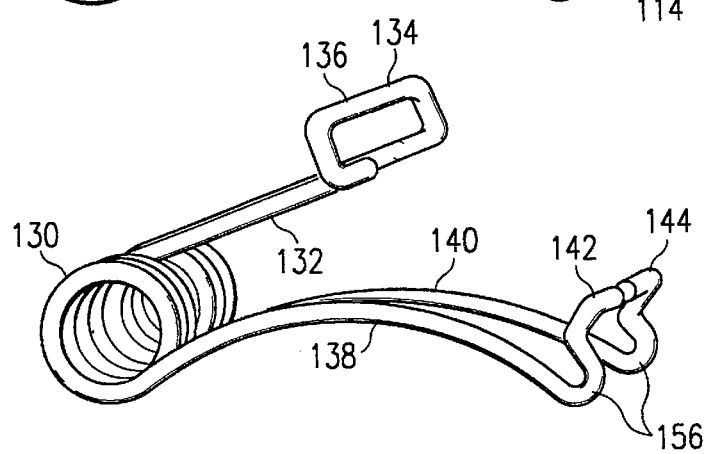
FIG. 10 is an isometric view of a fourth embodiment of the detent spring of this invention.

Referring now to FIG. 10, still another embodiment of the invention will be described. As shown in FIG. 10, the spring 46 is formed of cylindrical wire. As in the case of the first embodiment shown in FIGS. 4–7, and the second embodiment shown in FIGS. 8 and 9, the force applied by the spring as it moves into and out of the notches 50, 52 and 54 may be determined by selecting the characteristics of the spring wire including its diameter, resilience, etc., and the formation of the spring, including the number of spirals of spring the length of the arm, etc. As shown in FIG. 10, the spring, is formed from a single piece of cylindrical spring steel stock. The first end 130 of the spring is formed as a pair of helices. The inner end of each helix extends as an arm 132, at the respective ends of which is formed a generally rectangular portion 134. Side 136 of the rectangular portion 134 forms a detent 136 which engages the notches 50, 52, and 54 and the cylindrical surface therebetween. The outer ends of the helices are formed with arcuate extensions 138 and 140 which form the base of the spring. The radii of portions 138 and 140 may be chosen to be smaller than the radius of the arcuate base surface 152 of notch 42 (see, e.g., FIG. 11) such that only the ends 130 and 156 engage surface 152. Bent portions 142 and 144 are formed at the free ends of the arcuate extension to provide radial extensions similar to that of the embodiment shown in FIGS. 8 and 9.

Figure 11:
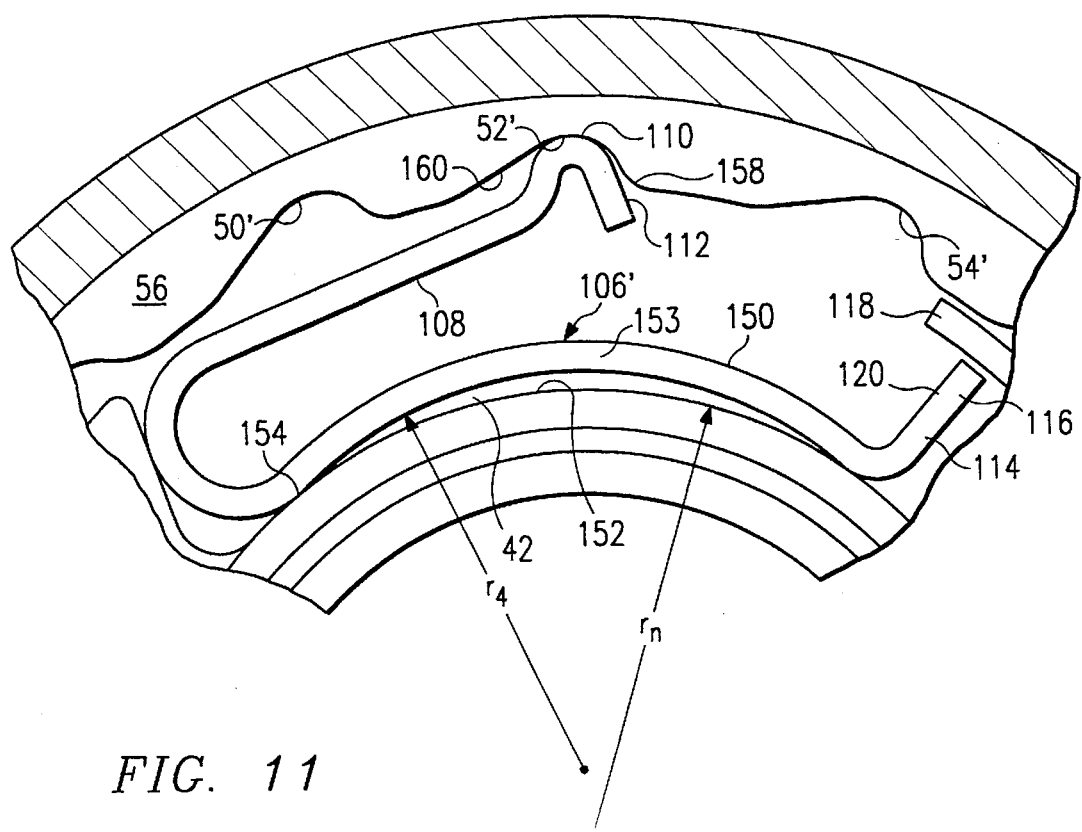
FIG. 11 is an axial enlarged fragmentary cross-sectional view showing a fifth embodiment of the detent spring of this invention in a position similar to that shown in FIG. 8.

Referring to FIG. 11, a further embodiment of a detent spring according to the invention is shown. This embodiment is similar tyo the one shown in FIGS. 8 and 9, and for that reason like characters identify like parts. In FIG. 11, a spring 106'is provided with a base 150 that has a radius of curvature $r_4$ that is smaller than radius of curvature $r_n$ of the arcuate surface 152 of notch 42. Therefore, only the first curved end 154 and the second end 114 of spring 106'engage surface 152, with middle portion 153 of the base 150 being spaced from surface 152.

FIG. 11 also shows notches 50', 52'and 54'having sides wjich form different angles with respect to the surface of cylindrical wall 56. This is another method by which the notch engaging portion 110 may be made to experience less force when it travels over e.g. side 148, which forms a lesser slope with respect to the surface of wall 56 than opposed side 160.

While preferred embodiments of the invention have been shown, it should be apparent to those skilled in the art that what have been described are considered at present to be preferred embodiments of the rotatable handgrip actuating system of this invention. In accordance with the patent statute, changes may be made in the system without actually departing from the true spirit and scope of this invention. The appended claims are intended to cover all such changes and modifications which fall in the true spirit and scope of this invention.

What is claimed is:

1. A rotatable handgrip actuating system for pulling or releasing a tensioned cable, the system comprising:

a generally cylindrical support member;

a grip fitting over said support member and rotatable by the hand of a user with respect to said support member, said grip having a generally cylindrical interior surface opposed to said support member;

a detent surface including a plurality of notches formed in a first one of said support member and said interior surface;

a detent spring contained by a second one of said support member and said interior surface, the detent spring including a base and a cantilever arm extending from an end of the base so as to form a pivot point therebetween, the cantilever arm having a detent disposed thereon, the detent being angularly displaced relative to the pivot point;

wherein said detent is urged against said detent surface by the detent spring, such that said grip is freely rotatable until said detent is in registry with one of the notches, said detent exhibiting a first resistance to escaping said one notch when the user rotates said grip in a first angular direction, and exhibiting a second resistance to escaping said one notch when the user rotates said grip in a second angular direction opposite the first angular direction, the second resistance being greater than the first resistance.

2. The system of claim 1, wherein said cantilever arm is integrally formed with said base.

3. The system of claim 1, wherein said detent is integrally formed with said cantilever arm.

4. The system of claim 1, wherein said base, cantilever arm and detent are integrally formed with each other.

5. The system of claim 1, wherein said detent is formed by a bend of said cantilever arm, said bend being convex in the direction of said detent surface.

6. The system of claim 1, wherein said base of said detent spring is defined by a length, and further wherein said first one of said support member and said interior surface includes an angularly elongated notch formed therein, the elongated notch having a length greater than said length of said base and first and second opposed sidewalls defining said length of said elongated notch, said base being slidable within said elongated notch when said detent has engaged said one notch as said grip is rotated relative to said support member, said first sidewall of said elongated notch preventing further sliding of said base within said elongated notch as said grip is rotated further with respect to said support member in a first direction, said second sidewall of said elongated notch preventing further sliding of said base within said elongated notch as said grip is rotated with respect to said support member in a second direction opposite said first direction.

7. A rotatable handgrip actuating system for releasing or pulling a tensioned cable, the system comprising:

a support member having a generally cylindrical outer surface;

a grip disposed over said generally cylindrical outer surface of said support member and rotatable relative thereto in a first direction and in a second direction opposite said first direction, a generally cylindrical inner surface of said grip facing said outer surface of said support member, one of said inner surface and said outer surface having a plurality of detent positions formed therein; and a spring metal detent spring disposed between said grip and said support member and engageable with one of said detent positions, said detent spring providing a first resistance against being forced out of said one detent position when said grip is rotated with respect to said support member in said first direction, said detent spring providing a second resistance against being forced out of said one detent position when said grip is rotated relative to said support member in said second direction, said second resistance being greater than said first resistance, the difference between the first and second resistances due at least in part to the shape of the detent spring.

8. The system of claim 7, wherein said detent spring includes a detent member adaptable to engage said detent positions, said detent member being convex in the direction of said detent positions.

9. A detent spring assembly cooperating with a second member movable with respect to a first member, the detent spring assembly defining predetermined positions of the first and second members relative to each other, the detent spring assembly comprising:

a surface of a first one of said members having an elongated notch provided thereon, the elongated notch having an elongated base and opposite sidewalls extending toward the second member;

a surface of a second one of said members having a series of spaced notches provided thereon, the surface of the second one of said members facing the surface of the first one of said members; and a detent spring including an elongated base portion having first and second ends, an arm extending from the first end so as to cantilever over the elongated base member, and a notch-engaging portion proximate a free end of the arm, the detent spring being positioned in the elongated notch such that the notch-engaging portion contacts the surface of the second one of said members as the second member is moved with respect to the first member and engages one of the spaced notches of the series when in alignment therewith, said sidewalls of the elongated notch being spaced apart a distance greater than an overall length of the detent spring to allow movement of the detent spring within the elongated notch.

10. The detent spring assembly of claim 9, wherein the surface of the first member and the surface of the second member are cylindrical, and the base portion of the detent spring is curved.

11. The detent spring assembly of claim 9, wherein the first and second ends of the base portion of the detent spring are formed as curved portions so the centers of the curved portions are located on an opposite side of the base portion than the center of the curve of the base portion.

12. The detent spring assembly of claim 9, wherein the notch-engaging portion includes a curved surface engageable with each spaced notch of the series.

13. The detent spring assembly of claim 9, wherein the notch-engaging portion is provided on the arm so that a cantilever loading is applied to flex the arm and urge the notch-engaging portion out of engagement with one of the spaced notches when the second member is moved relative to the first member in a direction from the first end of the base portion toward the second end, and a column loading is applied to flex the arm and urge the notch-engaging portion out of engagement with the spaced notch when the second member is moved relative to the first member in an opposite direction, the column loading required to urge the notch-engaging portion out of engagement with the spaced notch being greater than the cantilever loading required to urge the notch-engaging portion out of engagement with the spaced notch.

14. The detent spring assembly of claim 9, wherein the detent spring is formed from an elongated flat strip of spring metal.

15. A hand-rotatable control cable displacement actuating system, comprising:

a first stationary member;

a second member mounted coaxial to the first member and movable in relation thereto, the control cable displaceable as a result of movement of the second member with respect to the first member;

a detent spring for defining a predetermined position of the second member relative to the first member, wherein the second member is rotatable around the first member and a second one of the members has at least one notch provided on a surface thereof facing a first one of the members, the detent spring comprising:

an elongated base portion having first and second ends;

an arm extending only from and connected to the first end so as to cantilever over the elongated base member and having a free end remote from the first end of the base member; and a notch-engaging portion proximate the free end of the arm, the elongated base portion being mountable on a surface of the first one of the members facing the second one of the members such that the notch-engaging portion contacts the surface of the second one of the members as the second member is moved with respect to the first member and engages the notch when in alignment therewith.

16. The system of claim 15, wherein the notch-engaging portion is provided on the arm so that a cantilever loading is applied to flex the arm and urge the notch-engaging portion out of engagement with the notch when the second member is moved relative to the first member in a direction from the first end of the base portion toward the second end, and a column loading is applied to flex the arm and urge the notch-engaging portion out of engagement with the notch when the second member is moved relative to the first member in an opposite direction, the column loading required to urge the notch-engaging portion out of engagement with the notch being greater than the cantilever loading required to urge the notch-engaging potion out of engagement with the notch.

17. The system of claim 15, wherein the detent spring is integral.

18. The system of claim 17, wherein the detent spring is formed from an elongated flat strip of spring metal.

19. The system of claim 15, wherein said notch engaging portion presents a convex surface to the second one of the members.

* * * * *